(12) United States Patent
Wang et al.

(10) Patent No.: US 11,513,638 B2
(45) Date of Patent: Nov. 29, 2022

(54) SILVER NANOWIRE PROTECTION LAYER STRUCTURE AND MANUFACTURING METHOD THEREOF

(71) Applicant: Cambrios Film Solutions Corporation, Tortola (VG)

(72) Inventors: Yeh-Sheng Wang, Hsinchu (TW); Wei-Chia Fang, Hsinchu County (TW); Chun-Hung Chu, Hsinchu (TW); Chung-Chin Hsiao, Hsinchu County (TW); Ya-Ting Lin, Yunlin County (TW); Shih-Ching Chen, New Taipei (TW)

(73) Assignee: Cambrios Film Solutions Corporation, Tortola (VG)

( * ) Notice: Subject to any disclaimer, the term of this patent is extended or adjusted under 35 U.S.C. 154(b) by 88 days.

(21) Appl. No.: 17/126,201

(22) Filed: Dec. 18, 2020

(65) Prior Publication Data

US 2022/0197415 A1 Jun. 23, 2022

(51) Int. Cl.
*G06F 3/044* (2006.01)
*B82Y 40/00* (2011.01)
*H01B 1/00* (2006.01)

(52) U.S. Cl.
CPC .............. *G06F 3/044* (2013.01); *B82Y 40/00* (2013.01); *G06F 2203/04112* (2013.01); *H01B 1/00* (2013.01)

(58) Field of Classification Search
CPC ............. G06F 3/042; G06F 3/044; G06F 2203/04112; B82Y 40/00; H03K 17/9618; H03K 2017/9613; H01B 1/00
See application file for complete search history.

(56) References Cited

U.S. PATENT DOCUMENTS

| | | | | |
|---|---|---|---|---|
| 10,854,350 B2 * | 12/2020 | Allemand | ............... | B32B 15/08 |
| 11,099,703 B1 * | 8/2021 | Chan | ....................... | G06F 3/044 |
| 2009/0059151 A1 * | 3/2009 | Kim | ....................... | B82Y 20/00 |
| | | | | 977/762 |
| 2009/0162998 A1 * | 6/2009 | Lee | ................... | H01L 27/11507 |
| | | | | 438/585 |
| 2012/0132930 A1 | 5/2012 | Young et al. | | |
| 2012/0200516 A1 * | 8/2012 | Kim | ....................... | G06F 3/045 |
| | | | | 345/173 |
| 2014/0232950 A1 | 8/2014 | Park et al. | | |

(Continued)

FOREIGN PATENT DOCUMENTS

| | | |
|---|---|---|
| TW | 201804302 A | 2/2018 |
| TW | 202031506 A | 9/2020 |
| WO | 2013140975 A | 9/2013 |

*Primary Examiner* — Darlene M Ritchie
(74) *Attorney, Agent, or Firm* — Cooper Legal Group, LLC

(57) ABSTRACT

A silver nanowire (SNW) protection layer structure includes a substrate; a SNW layer, disposed on the substrate and covering only a partial region of a surface of the substrate, the SNW layer including a plurality of SNW channels; and a SNW protection layer, disposed on the SNW layer and covering a region corresponding to the plurality of SNW channels, the SNW protection layer including a light-resistant antioxidant. A manufacturing method for the SNW protection layer structure above is further provided. The SNW protection layer structure and the manufacturing method thereof are applicable in a touch sensor.

20 Claims, 7 Drawing Sheets

(56) References Cited

U.S. PATENT DOCUMENTS

| | | | |
|---|---|---|---|
| 2015/0079372 A1* | 3/2015 | Tsai | G06F 1/1692 |
| | | | 442/1 |
| 2015/0169113 A1* | 6/2015 | Ito | G06F 3/041 |
| | | | 524/544 |
| 2015/0255183 A1* | 9/2015 | Kim | H01B 1/02 |
| | | | 428/448 |
| 2015/0316955 A1 | 11/2015 | Dodds et al. | |
| 2019/0278406 A1* | 9/2019 | Yang | G06F 3/047 |
| 2019/0371830 A1* | 12/2019 | Hsiao | G06F 3/0445 |
| 2020/0012387 A1* | 1/2020 | Kim | H01L 27/3223 |
| 2020/0033993 A1* | 1/2020 | Kim | G06F 3/0443 |
| 2020/0081563 A1* | 3/2020 | Wang | G06F 3/04164 |
| 2020/0125209 A1* | 4/2020 | Chen | G06F 3/0416 |
| 2020/0301557 A1 | 9/2020 | Hsiao et al. | |
| 2021/0141491 A1* | 5/2021 | Gogte | G06F 3/04164 |
| 2022/0139591 A1* | 5/2022 | Yamaki | H01B 5/14 |
| | | | 345/173 |

* cited by examiner

SILVER NANOWIRE PROTECTION LAYER STRUCTURE AND MANUFACTURING METHOD THEREOF

BACKGROUND

1. Field of the Disclosure

The present disclosure relates to a silver nanowire (SNW) protection layer structure, and in particular to a SNW protection layer structure in which a SNW protection layer covers only a region corresponding to a plurality of SNW channels. The present disclosure further relates to a manufacturing method for the SNW protection layer structure above.

2. Description of the Related Art

A conventional silver nanowire (SNW) protection layer structure 10 and a manufacturing method thereof are as shown in FIG. 1. In the conventional SNW protection layer structure 10, after a patterned SNW layer 12 is disposed on a substrate 11, a SNW protection layer 13 disposed on the SNW layer 12 covers the entire region of the substrate 11.

The main function of a SNW protection layer is to protect a SNW layer, such that the SNW layer does not become ineffective because of light oxidation that may cause poor conductivity.

However, a light-resistant antioxidant in the components of a SNW protection layer of a conventional SNW protection layer structure absorbs blue light and violet light, and the SNW protection layer covers the entire region on a substrate, resulting in a phenomenon of significant yellowing of the overall conventional SNW protection layer structure.

BRIEF SUMMARY

To improve the issue of significant yellowing of the overall conventional SNW protection layer structure of the prior art, the present disclosure provides a novel silver nanowire (SNW) protection layer structure and a manufacturing method thereof.

To achieve the above and other objects, the present disclosure provides a SNW protection layer structure, including: a substrate; and a SNW layer disposed on the substrate and covering only a partial region of a surface of the substrate, the SNW layer including a plurality of SNW channels; and a SNW protection layer disposed on the SNW layer and covering only a region corresponding to the plurality of SNW channels, and the SNW protection layer including a light-resistant antioxidant.

In the foregoing SNW protection layer structure, a covering area of the SNW protection layer may occupy 6% to 60% of the surface of the substrate.

In the foregoing SNW protection layer structure, the width of the SNW protection layer may be in a range between 2 μm and 1 mm.

In the foregoing SNW protection layer structure, the thickness of the SNW protection layer may be in a range between 10 nm and 2000 nm.

In the foregoing SNW protection layer structure, the plurality of SNW channels may be corrugated.

In the foregoing SNW protection layer structure, the SNW layer may further include: a plurality of SNW dummies disposed among the plurality of SNW channels.

The foregoing SNW protection layer structure may further include: a plurality of conductive wires disposed between the SNW layer and the substrate.

The foregoing SNW protection layer structure may further include: a covering layer disposed on the SNW protection layer.

The foregoing SNW protection layer structure may further include: a second SNW protection layer structure disposed under the SNW protection layer structure, the second SNW protection layer structure including a second substrate; a second SNW layer disposed on the second substrate and covering only a partial region of a surface of the second substrate, the second SNW layer including a plurality of second SNW channels; a second SNW protection layer, disposed on the second SNW layer and covering only a region corresponding to the plurality of second SNW channels, and the second SNW protection layer including at least one of the light-resistant antioxidant or another light-resistant antioxidant; and a second covering layer disposed on the second SNW protection layer.

The foregoing SNW protection layer structure may further include: a second SNW layer disposed under the substrate and covering only a partial region of a second surface of the substrate, the second SNW layer including a plurality of second SNW channels; a second SNW protection layer disposed under the second SNW layer and covering only a region corresponding to the plurality of second SNW channels, and the second SNW protection layer including at least one of the light-resistant antioxidant or another light-resistant antioxidant; and a second covering layer disposed under the second SNW protection layer.

To achieve the above and other objects, the present disclosure further provides a manufacturing method for a SNW protection layer structure, the method including: providing a substrate; disposing a SNW layer on the substrate, the SNW layer covering only a partial region of a surface of the substrate, the SNW layer including a plurality of SNW channels; and disposing a SNW protection layer on the SNW layer, the SNW protection layer covering only a region corresponding to the plurality of SNW channels, and the SNW protection layer including a light-resistant antioxidant.

In the foregoing manufacturing method, a covering area of the SNW protection layer may occupy 6% to 60% of the surface of the substrate.

In the foregoing manufacturing method, the width of the SNW protection layer may be in a range between 2 μm and 1 mm.

In the foregoing manufacturing method, the thickness of the SNW protection layer may be in a range between 10 nm and 2000 nm.

In the foregoing manufacturing method, the plurality of SNW channels may be corrugated.

In the foregoing manufacturing method, the SNW layer may further include: a plurality of SNW dummies disposed among the plurality of SNW channels.

The foregoing manufacturing method may further include: disposing a plurality of conductive wires on the substrate, the plurality of conductive wires disposed between the SNW layer and the substrate.

The foregoing manufacturing method may further include: disposing a covering layer on the SNW protection layer.

The foregoing manufacturing method may further include: disposing a second substrate under the substrate; disposing a second SNW layer on the second substrate, the second SNW layer disposed under the substrate and covering only a partial region of a surface of the second substrate, the second SNW layer including a plurality of second SNW channels; disposing a second SNW protection layer on the second substrate, the second SNW protection layer disposed on the second SNW layer and located under the substrate, the second SNW protection layer covering only a region corresponding to the plurality of second SNW channels, and the second SNW protection layer including at least one of the light-resistant antioxidant or another light-resistant antioxidant; and disposing a second covering layer on the second SNW protection layer, the second covering layer located under the substrate.

The foregoing manufacturing method may further include: disposing a second SNW layer under the substrate, the second SNW layer covering only a partial region of a second surface of the substrate, the second SNW layer including a plurality of second SNW channels; disposing a second SNW protection layer under the second SNW layer, the second SNW protection layer covering only a region corresponding to the plurality of second SNW channels, and the second SNW protection layer including at least one of the light-resistant antioxidant or another light-resistant antioxidant; and disposing a second covering layer under the second SNW protection layer.

The SNW protection layer structure and the manufacturing method thereof of the present disclosure are capable of effectively improving the issue of significant yellowing of the overall conventional SNW protection layer structure of the prior art. Moreover, the SNW protection layer structure and the manufacturing method thereof of the present disclosure are capable enhancing optical performance of a touch sensor applying the same.

DETAILED DESCRIPTION

To facilitate understanding of the object, characteristics, and effects of this present disclosure, embodiments together with the attached drawings for the detailed description of the present disclosure are provided.

Unless otherwise specified in the context, singular terms "a/an" and "the" used in the detailed description and the appended claims cover meanings of plural forms.

Unless otherwise specified in the context, the term "or" used in the detailed description and the appended claims cover meanings of "and/or".

The term "pitch" used in the context refers to a shortest distance between a center axis of a silver nanowire (SNW) channel and a center axis of another SNW channel.

First Embodiment

Figure 1:
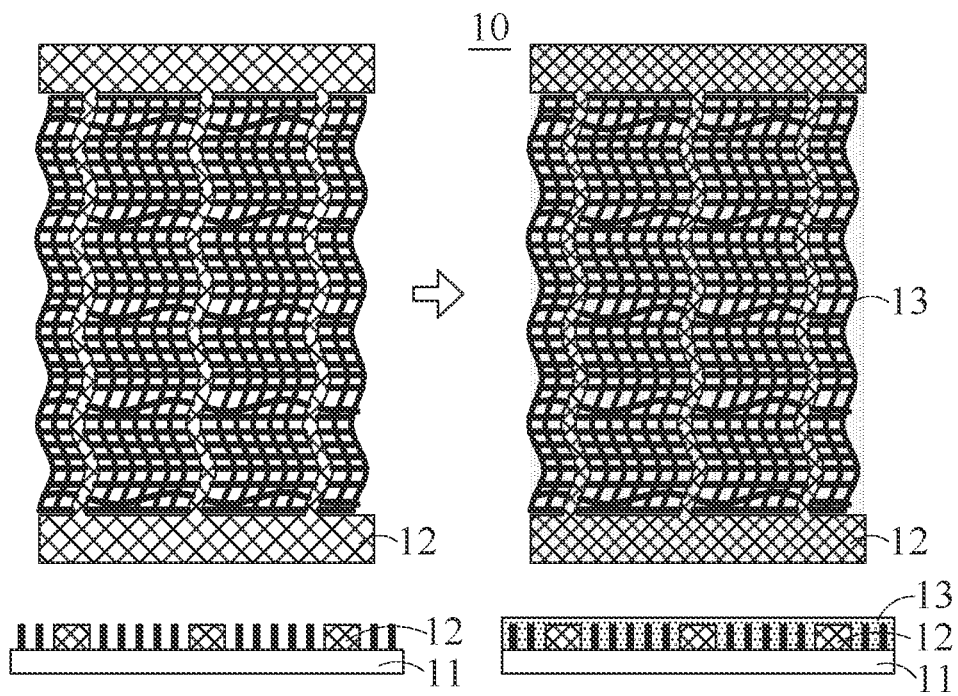
FIG. 1 is a silver nanowire (SNW) protection layer structure of the prior art.
Figure 2:
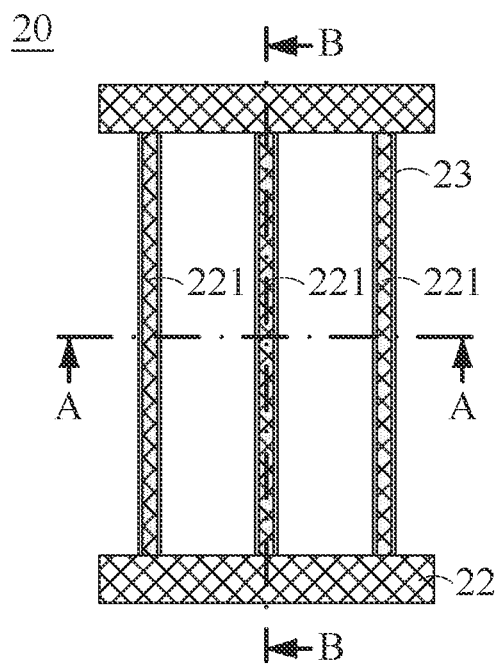
FIG. 2 is a schematic diagram of a SNW protection layer structure of a first embodiment.
Figure 3:
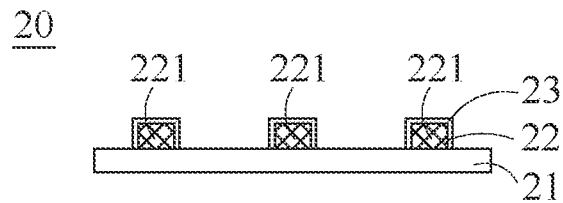
FIG. 3 is a section schematic diagram of a SNW protection layer structure of the first embodiment along a section line A-A.
Figure 4:
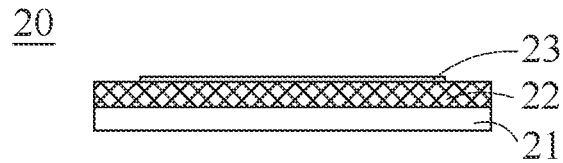
FIG. 4 is a section schematic diagram of a SNW protection layer structure of the first embodiment along a section line B-B.

As shown in FIG. 2 to FIG. 4, a SNW protection layer structure 20 of the first embodiment includes: a substrate 21 (not shown in FIG. 2); and a SNW layer 22, disposed on the substrate 21, covering only a partial region of a surface of the substrate 21, the SNW layer 22 including a plurality of SNW channels 221; and a SNW protection layer 23, disposed on the SNW layer 22, covering only a region corresponding to the plurality of SNW channels 221, and including a light-resistant antioxidant. By way of example and not limitation, the light-resistant antioxidant may include benzotriazole, 2-Hydroxy-4-methoxybenzophenone, 2-(2'-Hydroxy-3',5'-di-tert-butylphenyl)benzotriazole, octabenzone.

Figure 5:
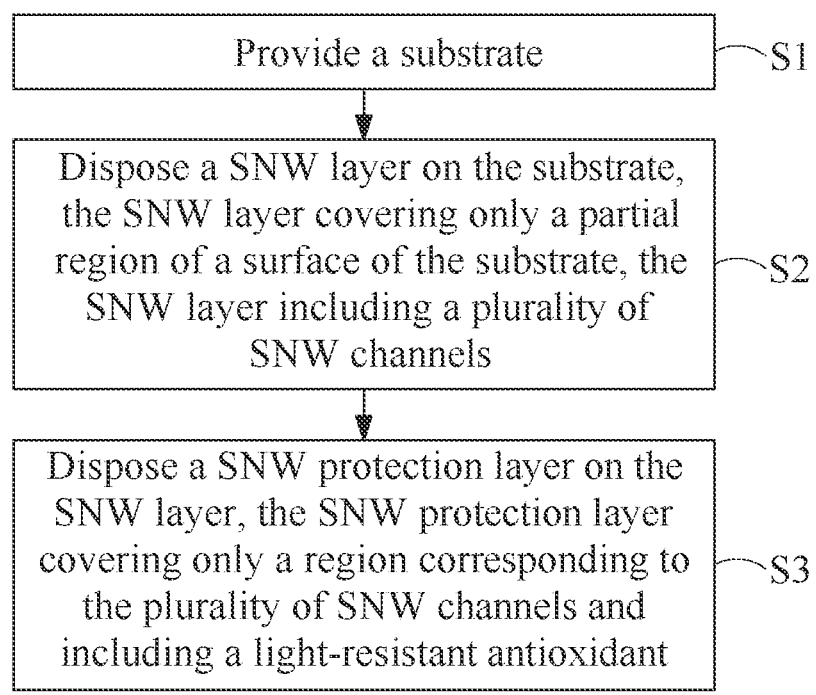
FIG. 5 is a flowchart of a manufacturing method for a SNW protection layer structure of the first embodiment.

The SNW protection layer structure 20 of the first embodiment can be manufactured by a manufacturing method shown in FIG. 5. As shown in FIG. 5, the manufacturing method for the SNW protection layer structure 20 of the first embodiment includes: S1, providing a substrate 21; S2, disposing a SNW layer 22 on the substrate 21, the SNW layer 22 covering only a partial region of a surface of the substrate 21, and including a plurality of SNW channels 221; and S3, disposing a SNW protection layer 23 on the SNW layer 22, the SNW protection layer 23 covering only a region corresponding to the plurality of SNW channels 221, and including a light-resistant antioxidant.

Compared to the prior art, in the SNW protection layer structure 20 and the manufacturing method thereof of the first embodiment, the SNW protection layer 23 covers only the region corresponding to the plurality of SNW channels 221, thereby reducing the covering area of the SNW protection layer 23, further effectively improving the issue of significant yellowing of the overall conventional SNW protection layer structure of the prior art, and at the same time effectively preventing ineffectiveness because of light oxidation that may cause poor conductivity.

In the SNW protection layer structure 20 and the manufacturing method thereof of the first embodiment, the covering area of the SNW protection layer 23 is not specifically defined. In a preferred embodiment, the covering area of the SNW protection layer 23 occupies 6% to 60% of the surface of the substrate 21.

In the SNW protection layer structure 20 and the manufacturing method thereof of the first embodiment, the width of the SNW protection layer 23 is not specifically defined. In a preferred embodiment, the width of the SNW protection layer 23 is in a range between 2 µm and 1 mm. By way of example, if the width is less than 2 µm, the SNW protection layer 23 may crack while being bent, and if the width is more than 1 mm, visibility of the SNW protection layer 23 may be influenced (e.g., the transparency of the SNW protection layer 23 may drop below a specified threshold when exposed to visible light having a wavelength between 400 nm and 700 nm).

In the SNW protection layer structure 20 and the manufacturing method thereof of the first embodiment, the thickness of the SNW protection layer 23 is not specifically defined. In a preferred embodiment, the thickness of the SNW protection layer 23 is in a range between 10 nm and 2000 nm. By way of example, if the thickness is less than 10 nm, the SNW protection layer 23 may crack while being bent, and if the thickness is more than 2000 nm, the visibility may be influenced.

Second Embodiment

Figure 6:
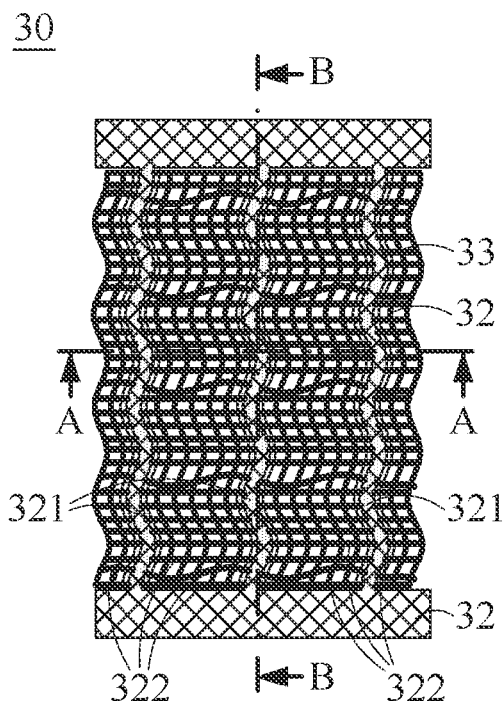
FIG. 6 is a schematic diagram of a SNW protection layer structure of a second embodiment.
Figure 7:
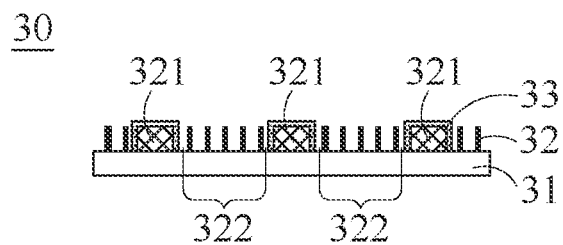
FIG. 7 is a section schematic diagram of a SNW protection layer structure of the second embodiment along a section line A-A.
Figure 8:
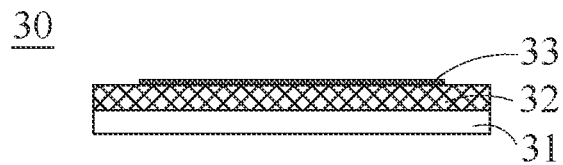
FIG. 8 is a section schematic diagram of a SNW protection layer structure of the second embodiment along a section line B-B.

As shown in FIG. 6 to FIG. 8, a SNW protection layer structure 30 of the second embodiment includes: a substrate 31 (not shown in FIG. 6); a SNW layer 32, disposed on the substrate 31, covering only a partial region of a surface of the substrate 31, the SNW layer 32 including a plurality of SNW channels 321; and a SNW protection layer 33, disposed on the SNW layer 32, covering only a region corresponding to the plurality of SNW channels 321, and including a light-resistant antioxidant.

Compared to the first embodiment, the plurality of SNW channels 321 in the SNW protection layer structure 30 of the second embodiment are corrugated.

Compared to the first embodiment, the SNW protection layer structure 30 of the second embodiment further includes: a plurality of SNW dummies 322, disposed among the plurality of SNW channels 321. As used herein, the plurality of SNW dummies 322 are structures defined between the plurality SNW channels 321 that are insulated (i.e., isolated) from each other and from the plurality of SNW channels 321. Although the plurality of SNW dummies 322 and the plurality of SNW channels 321 may be formed of the same material, the plurality of SNW dummies 322 are not intended to carry a signal and are used, in some embodiments, to naturalize the visibility (i.e., maintain a substantially uniform visibility) across a surface of the SNW protection layer structure 30.

The SNW protection layer structure 30 of the second embodiment is capable of preventing, by the plurality of corrugated SNW channels 321 and the plurality of SNW dummies 322, a touch sensor applying the SNW protection layer 33 from generating a Moiré pattern, further enhancing the optical properties of the touch sensor.

Third Embodiment

Figure 9:
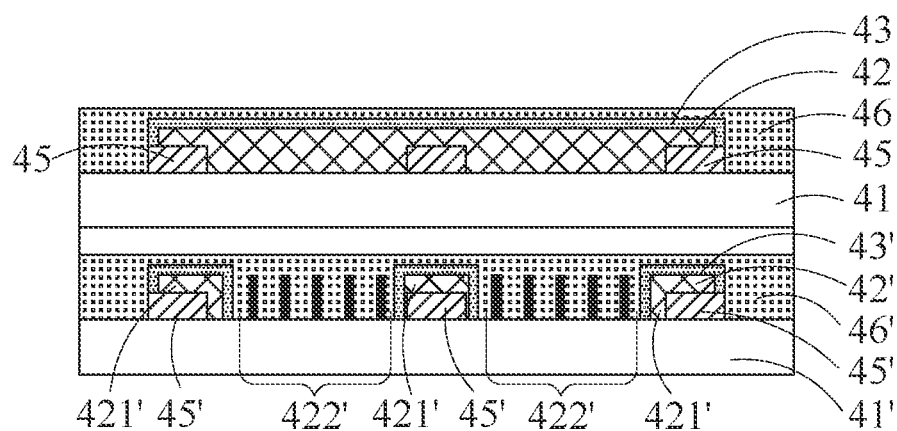
FIG. 9 is a schematic diagram of a SNW protection layer structure of a third embodiment.
Figure 10:
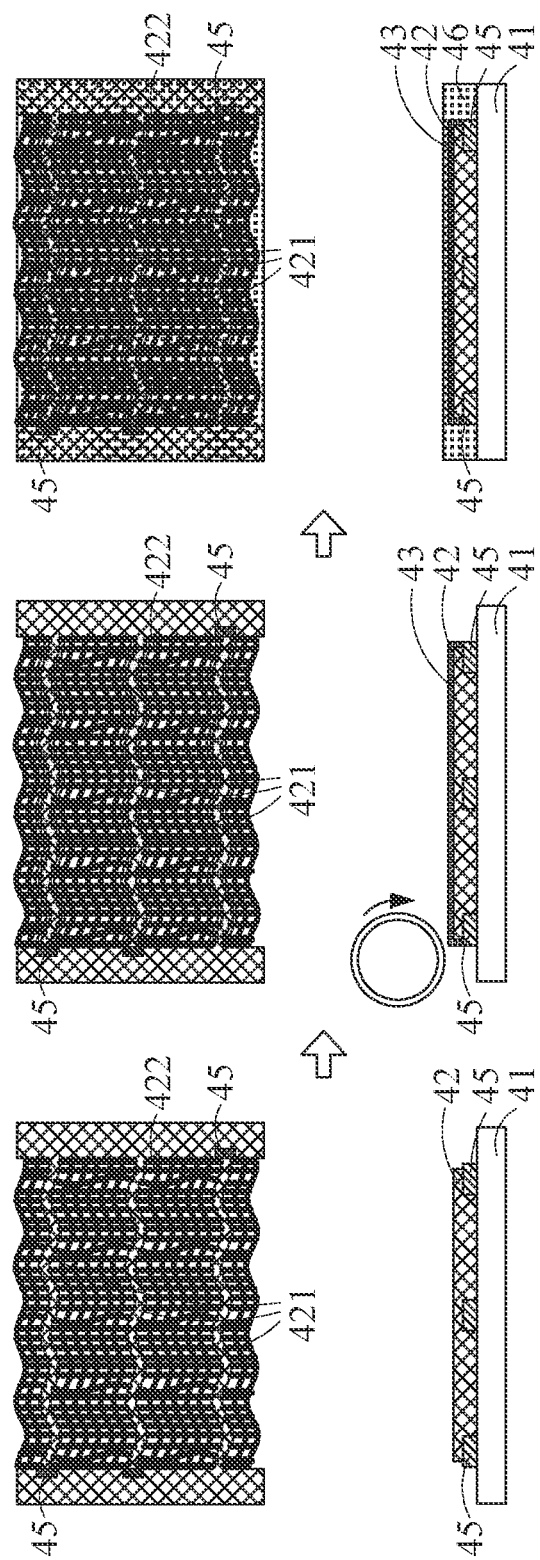
FIG. 10 is a schematic diagram of a manufacturing process of an upper structure of a SNW protection layer structure of the third embodiment.
Figure 11:
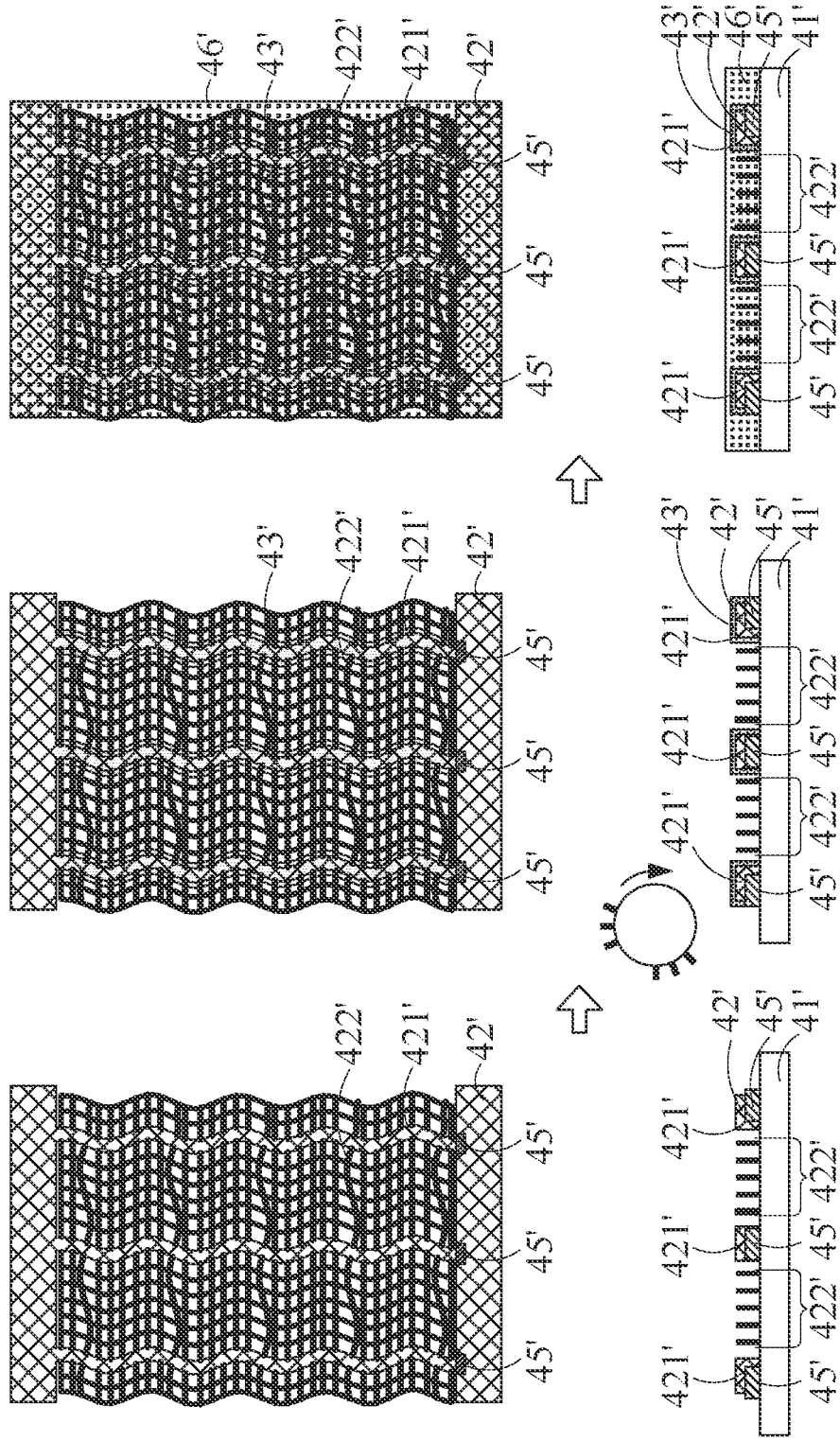
FIG. 11 is a schematic diagram of a manufacturing process of a lower structure of a SNW protection layer structure of the third embodiment.

As shown in FIG. 9 to FIG. 11, a SNW protection layer structure 40 of the third embodiment includes: a substrate 41; a SNW layer 42, disposed on the substrate 41, covering only a partial region of a surface of the substrate 41, the SNW layer 42 including a plurality of SNW channels 421 (not shown in FIG. 9) and a plurality of SNW dummies 422 (not shown in FIG. 9) disposed among the plurality of SNW channels 421; and a SNW protection layer 43, disposed on the SNW layer 42, covering only a region corresponding to the plurality of SNW channels 421, and including a light-resistant antioxidant.

Compared to the second embodiment, the SNW protection layer structure 40 of the third embodiment further includes: a plurality of conductive wires 45, disposed between the SNW layer 42 and the substrate 41; however, the present disclosure is not limited to the abovementioned layout.

Compared to the second embodiment, the SNW protection layer structure 40 of the third embodiment further includes: a covering layer 46, disposed on the SNW protection layer 43; however, the present disclosure is not limited to the abovementioned layout.

Compared to the second embodiment, the SNW protection layer structure 40 of the third embodiment further includes: a second substrate 41', disposed under the substrate 41; a second SNW layer 42', disposed on the second substrate 41' and located under the substrate 41, covering only a partial region of a surface of the second substrate 41', the second SNW layer 42' including a plurality of second SNW channels 421' and a plurality of second SNW dummies 422'; a second SNW protection layer 43', disposed on the second SNW layer 42' and located under the substrate 41, covering only a region corresponding to the plurality of second SNW channels 421', and including a light-resistant antioxidant; a plurality of second conductive wires 45', disposed between the second SNW layer 42' and the second substrate 41'; and a second covering layer 46', disposed on the second SNW protection layer 43' and located under the substrate 41.

The manufacturing process of the SNW protection layer structure 40 of the third embodiment is as shown in FIG. 9 to FIG. 11. As shown in FIG. 10, the upper structure of the SNW protection layer structure 40 can be made by the following steps: providing a substrate 41; disposing a plurality of conductive wires 45 on the substrate 41, the plurality of conductive wires 45 disposed between the plurality of SNW channels 421 and the substrate 41; disposing a SNW layer 42 on the substrate 41, the SNW layer 42 covering only a partial region of a surface of the substrate 41, the SNW layer 42 including a plurality of SNW channels 421 and a plurality of SNW dummies 422 disposed among the plurality of SNW channels 421; disposing a SNW protection layer 43 on the SNW layer 42 by applying a flexographic printing technique, the SNW protection layer 43 covering only a region corresponding to the plurality of SNW channels 421, and including a light-resistant antioxidant; and disposing a covering layer 46 on the SNW protection layer 43.

As shown in FIG. 11, the lower structure of the SNW protection layer structure 40 can be made by the following steps: providing a second substrate 41'; disposing a plurality of second conductive wires 45' on the second substrate 41', the plurality of second conductive wires 45' disposed between the plurality of second SNW channels 421' and the second substrate 41'; disposing a second SNW layer 42' on the second substrate 41', the second SNW layer 42' covering only a partial region of a surface of the second substrate 41', the second SNW layer 42' including a plurality of second SNW channels 421' and a plurality of second SNW dummies 422' disposed among the plurality of second SNW channels 421'; disposing a second SNW protection layer 43' on the second SNW layer 42' by applying a flexographic printing technique, the second SNW protection layer 43' covering only a region corresponding to the plurality of second SNW channels 421', and including a light-resistant antioxidant; and disposing a second covering layer 46' on the second SNW protection layer 43'.

Lastly, the upper structure of the SNW protection layer structure 40 shown in FIG. 10 is overlaid with the lower structure of the SNW protection layer structure 40 shown in FIG. 11, thus obtaining the SNW protection layer structure 40 of the third embodiment.

The SNW protection layer 43 and the second SNW protection layer 43' of the SNW protection layer structure 40 of the third embodiment are manufactured by a flexographic printing technique; however, the present disclosure is not limited to the abovementioned manufacturing technique, and the SNW protection layer 43 and the second SNW protection layer 43' can also be manufactured by a gravure printing technique.

The SNW channels 421 and the second SNW channels 421' in the upper structure and the lower structure of the SNW protection layer structure 40 of the third embodiment intersect by 90°, so that the upper structure and the lower structure can serve as a transmission (Tx) layer and a receiving (Rx) layer of a touch sensor.

Fourth Embodiment

Figure 12:
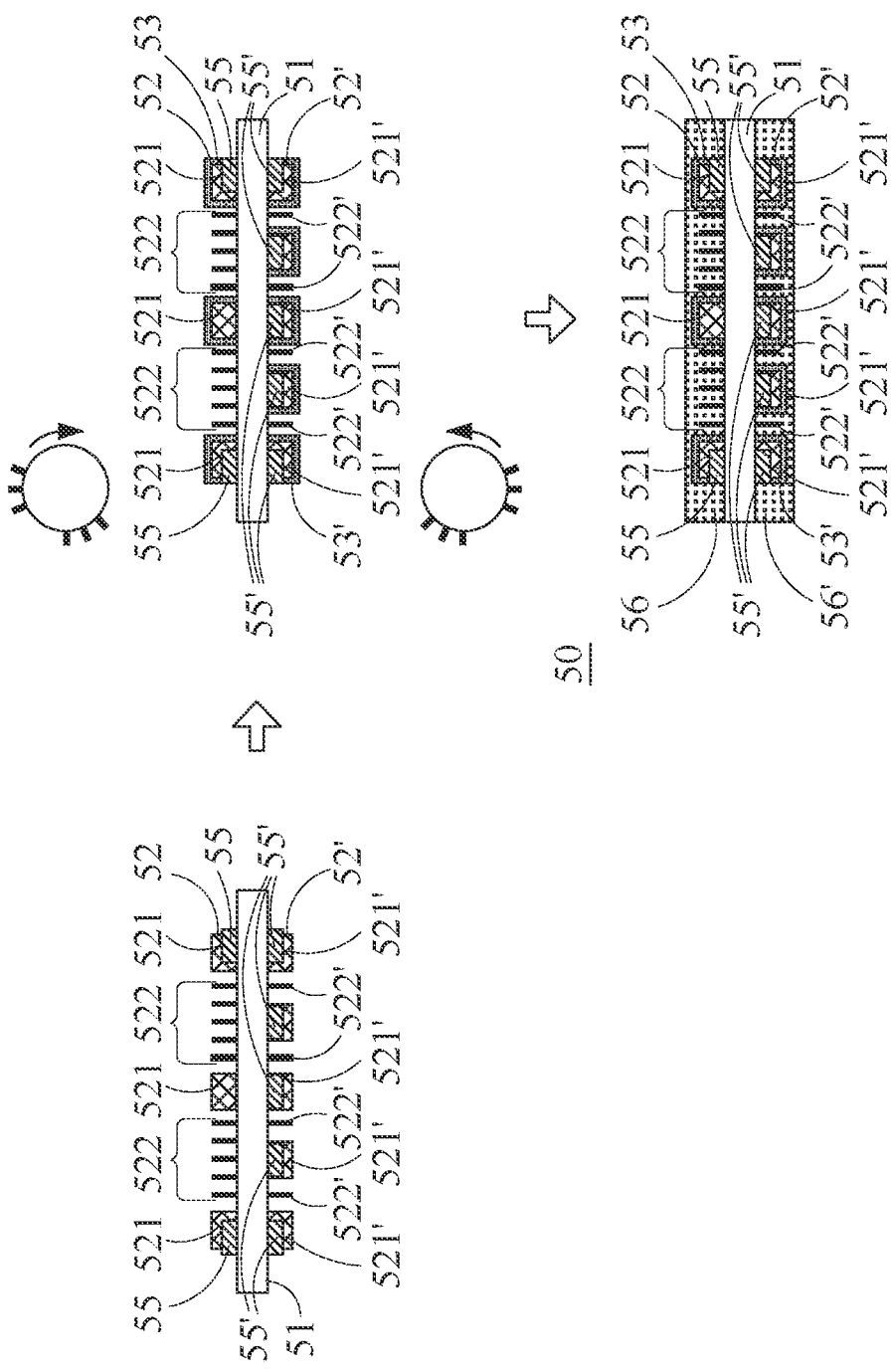
FIG. 12 is a schematic diagram of a SNW protection layer structure and a manufacturing method thereof of a fourth embodiment.

As shown in FIG. 12, a SNW protection layer structure 50 of the fourth embodiment includes: a substrate 51; a SNW layer 52, disposed on the substrate 51, covering only a partial region of a surface of the substrate 51, the SNW layer 52 including a plurality of SNW channels 521 and a plurality of SNW dummies 522 disposed among the plurality of SNW channels 521; a SNW protection layer 53, disposed on the SNW layer 52, covering only a region corresponding to the plurality of SNW channels 521, and including a light-resistant antioxidant; a plurality of conductive wires 55, disposed between the SNW layer 52 and the substrate 51; and a covering layer 56, disposed on the SNW protection layer 53.

The SNW protection layer structure 50 of the fourth embodiment further includes: a second SNW layer 52', disposed under the substrate 51, covering only a partial region of a second surface of the substrate 51, the second SNW layer 52' including a plurality of second SNW channels 521' and a plurality of second SNW dummies 522' disposed among the plurality of second SNW channels 521'; a second SNW protection layer 53', disposed under the second SNW layer 52', covering only a region corresponding to the plurality of second SNW channels 521', and including a light-resistant antioxidant; a plurality of second conductive wires 55', disposed between the second SNW layer 52' and the substrate 51; and a second covering layer 56', disposed under the second SNW protection layer 53'.

First Comparison Example

The first comparison example is a SNW structure that is not provided with a SNW protection layer, and includes only: a substrate; and a SNW layer, disposed on the substrate, and covering only a partial region of a surface of the substrate, the SNW layer including a plurality of SNW channels and a plurality of SNW dummies disposed among the plurality of SNW channels. The substrate and the SNW layer of the first comparison example are the same as those of the second embodiment, and the difference only lies in that the SNW structure of the first comparison example does not include the SNW protection layer.

Second Comparison Example

The SNW protection layer structure of the second comparison example is roughly the same as the SNW protection layer structure of the second embodiment, and the difference only lies in that in the SNW protection layer structure of the first comparison example, the SNW protection layer covers the entire region of the surface of the substrate.

Test Example

In order to understand the effects of the SNW protection layer structure of present disclosure with respect to improving the issue of significant yellowing of the overall conventional SNW protection layer structure of the prior art, optical properties of the SNW protection layer structures or SNW structures of the second embodiment, the first comparison example, and the second comparison example are tested.

The SNW protection layer structures or SNW structures of the second embodiment, the first comparison example, and the second comparison example have the same substrates and SNW layers; the difference only lies in: the SNW protection layer of the second embodiment covers only a region corresponding to the plurality of SNW channels, the first comparison example does not include the SNW protection layer, and the SNW protection layer of the second comparison example covers the entire region of the surface of the substrate.

Specifically, the dimensions of the substrates in the SNW protection layer structures or SNW structures of the second embodiment, the first comparison example, and the second comparison example are 15 cm×15 cm. The pitch of the SNW channels in the SNW protection layer structures or SNW structures of the second embodiment, the first comparison example, and the second comparison example is 5.26 mm, the width is 0.1823 mm, the SNW channels occupy 10.4% of the surface of the substrate, and the concentration of the SNW in the SNW layer is 0.07 wt %. The thickness of the SNW protection layers in the SNW protection layer structures of the second embodiment and the second comparison example is 90 nm.

Two repeated testing is performed on the SNW protection layer structures or SNW structures of the second embodiment, the first comparison example, and the second comparison example, and average values thereof are calculated. The test results are as shown in Table-1 below:

TABLE 1

|  | L | a* | b* |
|---|---|---|---|
| Second embodiment (first test) | 96.28 | −0.41 | 0.93 |
| Second embodiment (second test) | 95.86 | −0.47 | 0.96 |
| Second embodiment (average value) | 96.07 | −0.44 | 0.945 |
| First comparison example (first test) | 95.75 | −0.4 | 0.78 |
| First comparison example (second test) | 95.62 | −0.38 | 0.73 |
| First comparison example (average value) | 95.685 | −0.39 | 0.755 |
| Second comparison example (first test) | 96.14 | −0.59 | 1.43 |
| Second comparison example (second test) | 96.08 | −0.62 | 1.61 |
| Second comparison example (average value) | 96.11 | −0.605 | 1.52 |

The L, a*, and b* represent various values in CIELAB color space. L* represents lightness from black (0) to white (100), a* represents from green (−) to red (+) on a red-green axis, and b* represents blue (−) to yellow (+) on a yellow-blue axis. The value b* in Table-1 can serve as a yellowing index of the SNW protection layer structure. Compared to the second comparison example, the SNW protection layer structure of the second embodiment of the present disclosure has a lower b* value. It is apparent that the SNW protection layer structure and the manufacturing method thereof of the present disclosure are capable of effectively improving the issue of significant yellowing of the overall SNW protection layer structure of the prior art.

While the present disclosure has been described by means of specific embodiments, numerous modifications and variations could be made thereto by those skilled in the art without departing from the scope and spirit of the present disclosure set forth in the claims.

What is claimed is:

1. A silver nanowire (SNW) protection layer structure, comprising:
a substrate;
a SNW layer disposed on the substrate and covering only a partial region of a surface of the substrate, the SNW layer comprising a plurality of SNW channels; and
a SNW protection layer disposed on the SNW layer and covering only a region corresponding to the plurality of SNW channels, wherein:
the SNW protection layer comprises a light-resistant antioxidant, and
a b* value of the SNW protection layer structure in CIELAB color space is lower than 0.96.

2. The SNW protection layer structure according to claim 1, wherein a covering area of the SNW protection layer occupies 6% to 60% of the surface of the substrate.

3. The SNW protection layer structure according to claim 1, wherein a width of the SNW protection layer is in a range between 2 μm and 1 mm.

4. The SNW protection layer structure according to claim 1, wherein a thickness of the SNW protection layer is in a range between 10 nm and 2000 nm.

5. The SNW protection layer structure according to claim 1, wherein the plurality of SNW channels are corrugated.

6. The SNW protection layer structure according to claim 5, wherein the SNW layer further comprises:
a plurality of SNW dummies disposed among the plurality of SNW channels.

7. The SNW protection layer structure according to claim 1, further comprising:
a plurality of conductive wires disposed between the SNW layer and the substrate.

8. The SNW protection layer structure according to claim 1, further comprising:
a covering layer disposed on the SNW protection layer.

9. The SNW protection layer structure according to claim 8, further comprising:
a second substrate disposed under the substrate;
a second SNW layer disposed on the second substrate and located under the substrate, the second SNW layer covering only a partial region of a surface of the second substrate, the second SNW layer comprising a plurality of second SNW channels;
a second SNW protection layer disposed on the second SNW layer and located under the substrate, wherein:
the second SNW protection layer covers only a region corresponding to the plurality of second SNW channels, and
the second SNW protection layer comprises at least one of the light-resistant antioxidant or another light-resistant antioxidant; and
a second covering layer disposed on the second SNW protection layer and located under the substrate.

10. The SNW protection layer structure according to claim 8, further comprising:
a second SNW layer disposed under the substrate and covering only a partial region of a second surface of the substrate, the second SNW layer comprising a plurality of second SNW channels;
a second SNW protection layer disposed under the second SNW layer and covering only a region corresponding to the plurality of second SNW channels, wherein the second SNW protection layer comprises at least one of the light-resistant antioxidant or another light-resistant antioxidant; and
a second covering layer disposed under the second SNW protection layer.

11. A manufacturing method for a silver nanowire (SNW) protection layer structure, comprising:
providing a substrate;
disposing a SNW layer on the substrate, the SNW layer covering only a partial region of a surface of the substrate, the SNW layer comprising a plurality of SNW channels; and
disposing a SNW protection layer on the SNW layer, wherein:
the SNW protection layer covers only a region corresponding to the plurality of SNW channels,
the SNW protection layer comprising a light-resistant antioxidant, and
a b* value of the SNW protection layer structure in CIELAB color space is lower than 0.96.

12. The manufacturing method according to claim 11, wherein a covering area of the SNW protection layer occupies 6% to 60% of the surface of the substrate.

13. The manufacturing method according to claim 11, wherein a width of the SNW protection layer is in a range between 2 μm and 1 mm.

14. The manufacturing method according to claim 11, wherein a thickness of the SNW protection layer is in a range between 10 nm and 2000 nm.

15. The manufacturing method according to claim 11, wherein the plurality of SNW channels are corrugated.

16. The manufacturing method according to claim 15, wherein the SNW layer further comprises:
a plurality of SNW dummies disposed among the plurality of SNW channels.

17. The manufacturing method according to claim 11, further comprising:
disposing a plurality of conductive wires on the substrate, the plurality of conductive wires disposed between the SNW layer and the substrate.

18. The manufacturing method according to claim 11, further comprising:
disposing a covering layer on the SNW protection layer.

19. The manufacturing method according to claim 18, further comprising:
disposing a second substrate under the substrate;
disposing a second SNW layer on the second substrate, the second SNW layer disposed under the substrate and covering only a partial region of a surface of the second substrate, the second SNW layer comprising a plurality of second SNW channels;
disposing a second SNW protection layer on the second substrate, the second SNW protection layer disposed on the second SNW layer and located under the substrate, wherein:
the second SNW protection layer covers only a region corresponding to the plurality of second SNW channels, and
the second SNW protection layer comprising at least one of the light-resistant antioxidant or another light-resistant antioxidant; and
disposing a second covering layer on the second SNW protection layer, the second covering layer located under the substrate.

20. The manufacturing method according to claim 18, further comprising:

disposing a second SNW layer under the substrate, the second SNW layer covering only a partial region of a second surface of the substrate, the second SNW layer comprising a plurality of second SNW channels;

disposing a second SNW protection layer under the second SNW layer, wherein:

the second SNW protection layer covers only a region corresponding to the plurality of second SNW channels, and the second SNW protection layer comprising at least one of the light-resistant antioxidant or another light-resistant antioxidant; and disposing a second covering layer under the second SNW protection layer.

* * * * *